No. 863,301. PATENTED AUG. 13, 1907.
C. L. MIEL.
STONE SAW.
APPLICATION FILED DEC. 1, 1905.

Witnesses
Inventor
CHARLES L. MIEL
By his Attorneys

UNITED STATES PATENT OFFICE.

CHARLES L. MIEL, OF SACRAMENTO, CALIFORNIA, ASSIGNOR TO THE UNITED STATES STONE SAW COMPANY, OF TUCSON, ARIZONA TERRITORY, A CORPORATION OF ARIZONA TERRITORY.

STONE-SAW.

No. 863,301.    Specification of Letters Patent.    Patented Aug. 13, 1907.

Application filed December 1, 1905. Serial No. 289,718.

*To all whom it may concern:*

Be it known that I, CHARLES L. MIEL, a citizen of the United States, residing at Sacramento, county of Sacramento, State of California, have invented certain new and useful Improvements in Stone-Saws, of which the following is a full, clear, and exact description.

My invention relates to improvements in apparatus or machines for sawing stone, and particularly the type which employs a finely divided abrasive material such as steel shot.

The object of the invention is to improve the construction of the blades so that the stone is not scored or striated on the sides during the cutting operation. The result of the attainment of this object is to leave the stone in such a condition after cutting that it does not ordinarily require planing. Much of the stone is thus saved. This is particularly useful where thin slabs are to be cut from expensive stone. It applies particularly to the cutting of sandstone or other soft or readily striated stones. By reducing the friction on the sides of the blades caused by the lodging of the abrasive material between the blades and the stone, it is possible to accelerate the speed of the saw and to accomplish a greater amount of work in a given time. This is accomplished by forming a plurality of pockets or grooves in the sides of the saw-blades into which the shot or other abrasive material may find its way. The abrasive material, in this type of saw, is usually fed in at the top of the stone and is supposed to fall down between the adjacent edges of the blades. Some of the material, however, always finds its way into the sides of the cut and is likely to be ground back and forth by the saw causing loss of power and injury to the stone. By the provision of these pockets or grooves the abrasive material that falls into the cut alongside the blade is allowed to be drawn back and forth to the end of the stroke with much less tendency to striate the sides of the cut.

Figure 1:
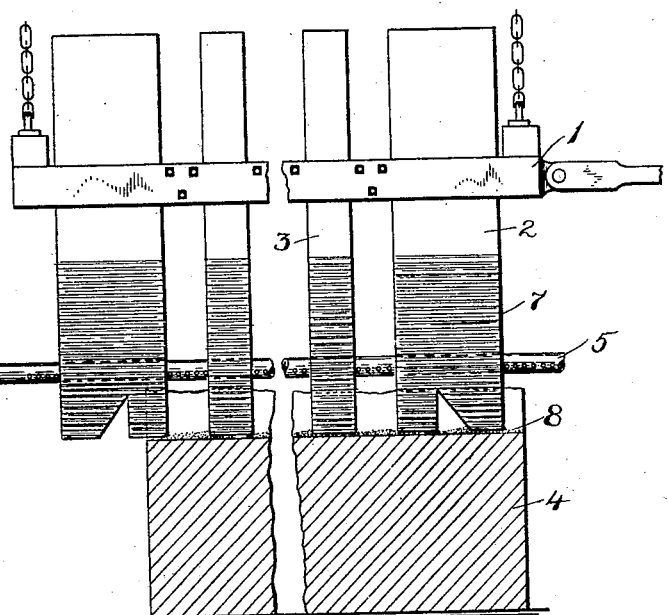
Figure 2:
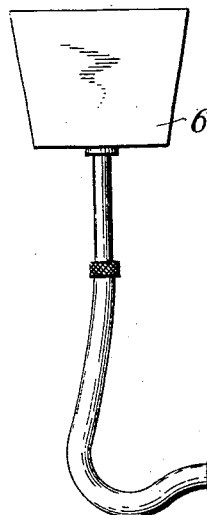
Figure 2:
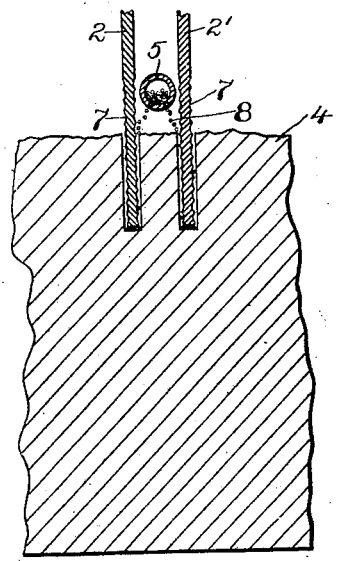

Figure 1 is a view of a saw-frame with blades embodying the improvement of my invention, shown as having partially completed a cut, and with means for feeding the abrasive material between the blades. Fig. 2 is a fragmentary view showing two parallel blades with the shot-feed tube between them, in the operation of cutting.

1 indicates a beam adapted to reciprocate in the customary manner.

2 indicates a blade carried by the saw beam and vertically arranged. 3 is another blade arranged in line with blade 2. The blades may be of any width or length and constructed as shown in my former patents. Preferably they are of the long type, and provided with means for indefinite vertical adjustment relative to the saw-beam.

4 indicates the stone which is being operated upon. 5 is a tube or conduit through which the abrasive material or shot is fed from the tank or reservoir 6.

7 indicates the pockets or grooves in the sides of the blades. These pockets are preferably formed on both sides of the blades so that no striation of the stone will be produced on either side. It will be obvious, however, that in some cases it may not be necessary to have the blades grooved on both sides.

The invention is particularly valuable where thin slabs of stone are being sawed out by the employement of two blades 2—2′. In this case it is essential that both blades be grooved on their adjacent sides, so that the thin slab is not scored on either side. 8 indicates the shot or other abrasive material, particles of which fall down alongside the blades in the cut. The grooves are preferably provided extending entirely across the blade, and a plurality of them on each side extending substantially throughout the entire operative length. The grooves may be of any cross-sectional form, but should be adapted to the character of the abrasive material employed, and of a size depending upon the size of the largest particles of the abrasive material.

In machines of the preferred type the blades are adapted to be used substantially throughout their entire length and consequently the grooves or pockets would correspond throughout the entire length, but it is unnecessary to illustrate further than in the accompanying drawings. The pockets are shown in the form of grooves extending substantially parallel with the bearing edge of the blades. They might be slightly inclined, however, and still perform their function provided they are of proper cross-sectional shape. With the pockets extending across the entire blade the shot are more readily thrown out at the end of each stroke in the clearance space thus provided so that the shot do not collect and wedge against one another.

What I claim is:

1. In a stone saw, a reciprocating saw beam, a long relatively thin and narrow stone saw blade carried thereby, the end of said blade constituting the cutting edge, said blade having grooves in the side faces substantially parallel to said cutting edge to afford clearance spaces for abrasive material, said grooves extending from edge to edge of said blade.

2. In a stone saw, a reciprocating saw beam, a long relatively thin and narrow stone saw blade carried thereby, the end of said blade constituting the cutting edge, said blade having grooves in the side faces substantially parallel to said cutting edge to afford clearance spaces for abrasive material, said grooves extending from edge to edge of said blade, in combination with means for feeding a finely divided abrasive material into the space adjacent to the edge of said blade.

3. In a stone saw, a reciprocable saw beam, two series of long, relatively thin and narrow saw blades carried by said beam, the blades of one series being spaced apart laterally from but substantially parallel to the blades of the other series, the adjacent faces of the blades having horizontal grooves for affording clearance spaces for abrasive material, and a longitudinally disposed conduit between the two series of blades for feeding finely divided abrasive material into the spaces between the blades of each series.

CHARLES L. MIEL.

Witnesses:
ALBERT L. TRIPLETT,
WILLIAM HEWSON DAVIS.